United States Patent [19]
Lueke

[11] Patent Number: 5,292,027
[45] Date of Patent: Mar. 8, 1994

[54] TENSION AND COMPRESSION EXTENSIBLE LINER FOR A PRIMARY VESSEL

[75] Inventor: Joseph C. Lueke, Downey, Calif.

[73] Assignee: Rockwell International Corporation, Seal Beach, Calif.

[21] Appl. No.: 956,200

[22] Filed: Oct. 5, 1992

[51] Int. Cl.⁵ .............................................. B22F 5/00
[52] U.S. Cl. .................................. 220/470; 220/442; 52/630
[58] Field of Search ............... 220/470, 408, 435, 441, 220/442, 901; 52/267, 630; 29/897.32

[56] References Cited

U.S. PATENT DOCUMENTS

| | | | |
|---|---|---|---|
| 1,808,590 | 6/1931 | Andernach | 264/287 |
| 1,847,216 | 3/1932 | Hubbard | |
| 1,968,088 | 7/1934 | Mekler | 196/133 |
| 2,308,943 | 1/1943 | Tietig et al. | 52/630 X |
| 2,771,164 | 11/1956 | Scurlock | 220/630 X |
| 3,088,621 | 5/1963 | Brown | 220/9 |
| 3,184,094 | 5/1965 | French et al. | 220/442 X |
| 3,224,621 | 12/1965 | Upthegrove | 220/442 X |
| 3,332,386 | 7/1967 | Massac | 220/901 X |
| 3,362,118 | 1/1968 | Brunner | 52/630 X |
| 3,407,788 | 10/1968 | Hagmann | 220/630 X |
| 3,434,617 | 3/1969 | Sieders | 220/9 |
| 3,485,596 | 12/1969 | Alleaume | 220/442 X |
| 3,510,278 | 5/1970 | Alleaume | 220/442 X |
| 3,547,302 | 12/1970 | Jackson et al. | 220/15 |
| 3,956,543 | 5/1976 | Stangeland | 220/442 X |
| 4,012,932 | 3/1977 | Gewiss | 72/187 |
| 4,025,599 | 5/1977 | Keith | 264/982 |

*Primary Examiner*—Steven M. Pollard
*Attorney, Agent, or Firm*—Lawrence N. Ginsberg; Charles T. Silberberg

[57] ABSTRACT

A liner for a primary vessel comprises a plurality of attached, corrugated continuous sheets of membrane-type material. Each sheet has a herringbone pattern of repetitive parallelogram-like elements. Each parallelogram-like element is bounded at its four sides by bends to adjacent parallelogram-like elements, each sheet having minimally developed corrugations. The continuous sheets are therefore supportable by bearing walls of the primary vessel and may follow any deflections of these walls under conditions of structural stress and thermal deformation.

6 Claims, 5 Drawing Sheets

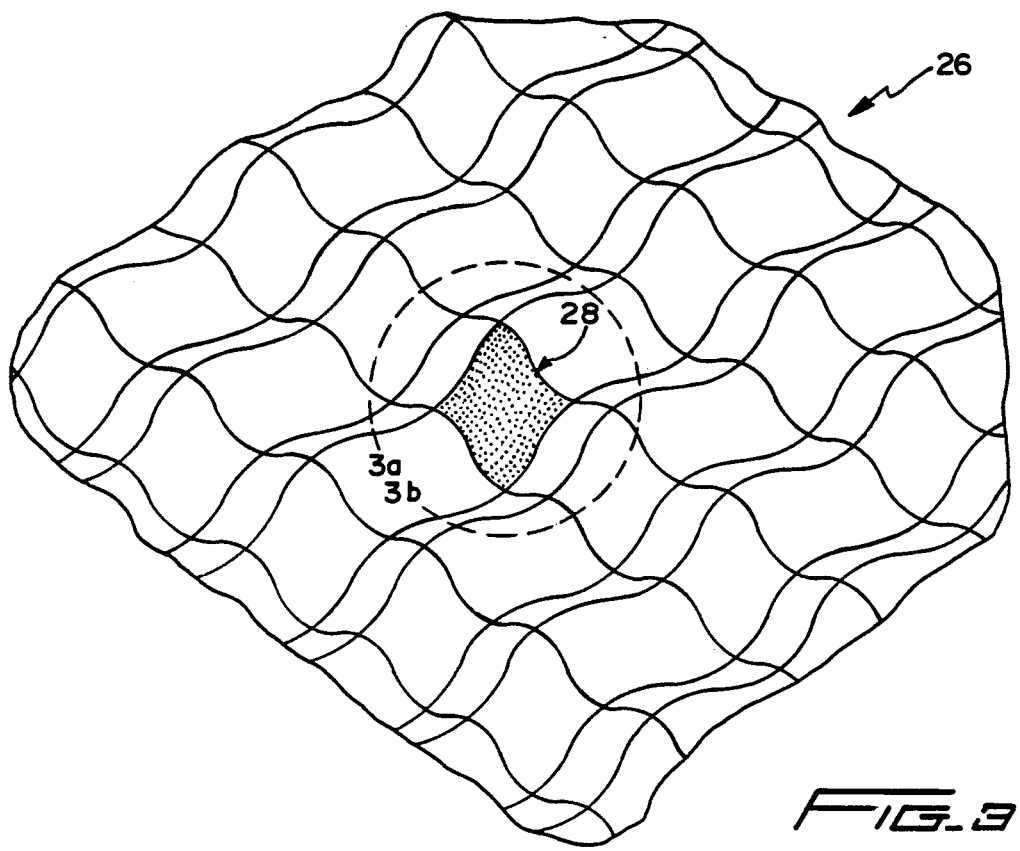
FIG. 3
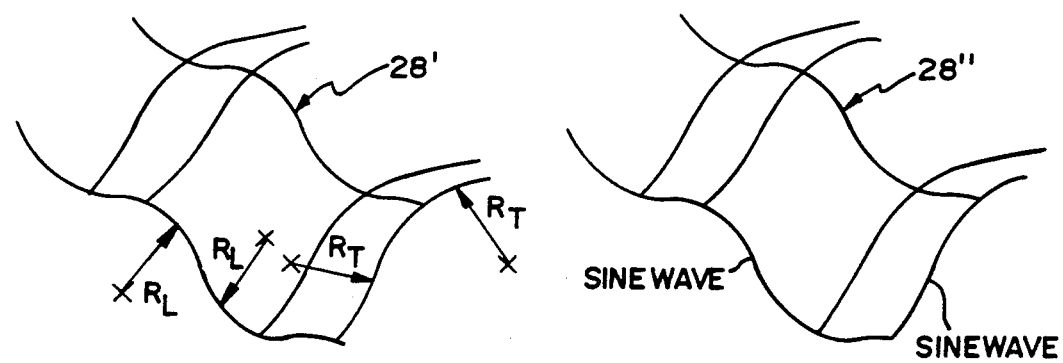
FIG. 3a
FIG. 3b

TENSION AND COMPRESSION EXTENSIBLE LINER FOR A PRIMARY VESSEL

STATEMENT OF GOVERNMENT INTEREST

This invention was made with Government support under Contract No. F33657-86-C-2127 awarded by the United States Air Force. The Government has certain rights in this invention.

BACKGROUND OF THE INVENTION

1. Field of the Invention

This invention relates to liners for primary vessels and more particularly to an extensible and compressible liner for a primary vessel which does not maintain structural support for that primary vessel.

2. Description of the Related Art

Liners are used for fluid, gas, vacuum and granular solids containment. Some types of liners are only used for containment and do not provide structural support of the pressure applied to the liner by the contents, ullage gas or vacuum. (It is understood, however, that these liners do provide support between small gaps in the surface of the primary vessel which are bridged by the liners.) This type of liner is the subject of the present invention.

Pressure is transmitted through the liner and is supported by other load paths. As such, this type of liner must flex, expand, and contract to follow the relative displacements of the supporting primary vessel without significantly altering the pressure distribution to the primary vessel and yet still fulfill its functional requirements. Such external primary vessels may include (by way of illustration and not limitation), for example the hull of the ship, the shell of an aircraft or a tank. Such liners may also be used with the primary vessel that provides internal support for the liner. An example of such an internal vessel (where the liner is external) is a vacuum bag supported by its contents or internal structure.

Requirements of both these external and internal liners usually include elastic behavior of the liner up to maximum strains, maximum operating pressure, cycle life and thermal environments. To accomplish their objectives, the liners are usually textured. Texturing, as defined herein, is a design to gather, stretch, compress, shear or a combination of the above, moving the planar sheet, which forms the liner, out of plane in the form of multiple waves, folds, or dimples. The resulting excess material allows the liner to fulfill its desired functions. Texturing of this type also provides for relatively easy manufacturing of simple and compound shaped liners by forming on assembly, forming during or after texturing, or a combination thereof.

Containment of cryogenic fluids in a primary vessel at normal or very hot temperatures is particularly problematic. Similarly, containment of a vacuum bag around insulation (in this instance serving as the primary vessel), presents challenging design obstacles. Both applications require large strains (0.010 to 0.020 inches per inch), many times the yield of most liner type of materials, to accommodate the thermal and applied load deformation of the primary vessel.

For applications involving hot or cryogenic temperatures, and for the leak tightness necessary for some gases or liquids, metal liners are required. Metal liners must also be thin to meet desired flexibility and weight requirements. Stretching thin foil is a manufacturing problem and leak tightness is also impaired. Therefore, the design in which most of the texturing of the sheet is produced by a minimum amount of gathering is desired, if not mandatory.

Another essential attribute of an extensible and compressible liner is that it must accommodate the three-dimensional and biaxial nature of the deformed structure. Thermal displacements are nearly equal in all directions. An idealized metal cylinder pressure vessel has a 5-to-1 expansion ratio between the circumferential and longitudinal directions. Therefore, the natural longitudinal versus transverse biaxial displacement of the texture design should be either both extensible (+/+) or both compressible (−/−). Many textures even produce −/+ and displacements similar to the Poisson's Ratio effects in monolithic metals. These types of textures also produce very rigid stiffness in non-longitudinal/transverse, 45° directions. This type of action is unsuitable for the requirements previously stated.

Liners are very rarely made from one monolithic sheet, thereby necessitating the need for individual textured sheets to be attached to each other or to close-out edge members of the primary vessel. Where leak tightness is required, proper matching of the textures of adjacent sheets at the joints is essential. Complexities of the texture make this matching difficult. The requirement for this matching, for complete folds and for adapting to corners of the primary vessel, present a very formidable set of design requirements, heretofore believed to be insolvable for practical applications. As will be disclosed below, the liner of the present invention meets all of these requirements.

U.S. Pat. No. 3,184,094, entitled "Extensible Metal Sheets", issued to M. J. French et al., discloses an extensible unitary, continuous, fluid impermeable sheet including an enclosed area bounded entirely by non-intersecting but meeting corrugations in the sheet, which corrugations extend linearly beyond the enclosed area, and which corrugations are capable of flexing in response to thermal expansion of the sheet. However, the folds are relatively widely spaced, creating a complicated folding at the intersections of the multi-directional folding. Since the folds are far apart, substantial motion at each fold is required because of the non-textured material between the folds are rigid. Furthermore, the bends for the folds approach a full (180°) fold which would be difficult to be utilized on thin metal liners, especially at the multi-directional folds at intersections. Additionally, the complexity of the folding disclosed in the '094 patent would limit applications to large scale patterns for producibility.

U.S. Pat. No. 3,547,302, entitled "Container for Liquified Gases", issued to R. G. Jackson et al., discloses a container for cryogenic liquids having load-bearing insulating walls backing up thin, flexible membrane walls which constitute the primary container. The membrane walls are attached at the corners to rigid angle-section anchoring members which are supported by the insulating walls, and which are sufficiently strong to transmit to the insulating walls, without appreciable deformation, all loads transmitted to them by the membrane walls.

U.S. Pat. No. 3,956,543, entitled "Shear Flexibility for Structures", issued to M. L. Stangeland, discloses a flexible sheet member having cross convolutions oriented 45° to the shear vector with spherical reliefs at the convolution junctions. The Stangeland invention requires extensive stretching.

U.S. Pat. No. 1,808,590, entitled "Method of Manufacturing Paper, Pasteboard, Felt and the Like", issued to A. W. Andernach, discloses a process producing biaxial texturing which pertains mainly to processing fibrous products.

U.S. Pat. No. 1,968,088, entitled "Protective Lining for Vessels", issued to L. A. Mekler, discloses a corrugated liner for vessels. The Mekler device has a single corrugation and as such handles flexure in only one direction.

U.S. Pat. No. 3,088,621, entitled "Insulated Tank for the Storage and Transportation of a Cold Boiling Liquefied Gas", issued to E. H. Brown, addresses the biaxial flexure requirements of a cryogenic liner. However, the corrugation described in that patent requires forming and stretching.

U.S. Pat. No. 3,434,617, entitled "Liquid Storage Tank", issued to C. H. Sieders et al., addresses multi-directional expansion requirements. However, use of the widely spaced corrugations disclosed in the Sieders patent would require stretching to form the liner.

U.S. Pat. No. 4,025,599, entitled "Cuspated Sheet Forming", issued to D. G. Keith, discloses a process for forming thermoplastic sheets. The resulting geometry appears as an origami pattern obtained by thermoplastic deformation.

U.S. Pat. No. 4,012,932, entitled "Machine for Manufacturing Herringbone-Pleated Structures", issued to L. V. Gewiss, discloses a machine that includes consecutive feeding forming and bunching components by which a continuous band of flat sheet material, which may be prepleated longitudinally, is fed between a pair of endless forming assemblies which cooperate to form continuously a roughed-out shape of the final herringbone-pleated structure and which also advance to a bunching means positioned downstream from the forming assemblies.

U.S. Pat. No. 1,847,216, entitled "Packing", issued to C. R. Hubbard, discloses use of an origami type of folding in a "full fold on itself" condition. This produces a very dense and strong but flexible packing for heavy parts.

SUMMARY OF THE INVENTION

In its broad aspects, the present invention comprises a plurality of attached, corrugated continuous sheets of membrane-type material. Each sheet has a herringbone pattern of repetitive parallelogram-like elements. Each parallelogram-like element is bounded at its four sides by bends to Adjacent parallelogram-like elements, each sheet having minimally developed corrugations. The continuous sheets are therefore supportable by bearing walls of the primary vessel and may follow any deflections of these walls under conditions of structural stress and thermal deformation.

In a preferred embodiment, the sides comprise sinusoidal arcs and the bends comprise sinusoidal arcs over the length of each said parallelogram-like element. In another preferred embodiment these sides and bends comprise circular arcs.

The liner of the present invention is capable of flexing, expanding and contracting to follow the displacements of the supporting structure without significantly altering the pressure distribution to the supporting load paths and still fulfills its functional requirements. These requirements usually include elastic behavior up to maximum strains, maximum pressure and cyclic life.

Other object, advantages, and novel features of the present invention will become apparent from the following detailed description of the invention when considered in conjunction with the accompanying drawings.

BRIEF DESCRIPTION OF THE DRAWINGS

FIG. 3 is a perspective view of modified parallelogram-like texturing in which the sides of the parallelogram-like elements are not straight.

FIG. 3a illustrates an enlarged view of FIG. 3 in which the sides of the parallelogram-like elements are formed of circular arcs.

FIG. 3b is an enlarged view of a portion of FIG. 3 in which the sides of the parallelogram-like elements are formed of sine waves.

The same elements or parts throughout the figures are designated by the same reference characters.

DETAILED DESCRIPTION OF THE PREFERRED EMBODIMENTS

Figure 1:
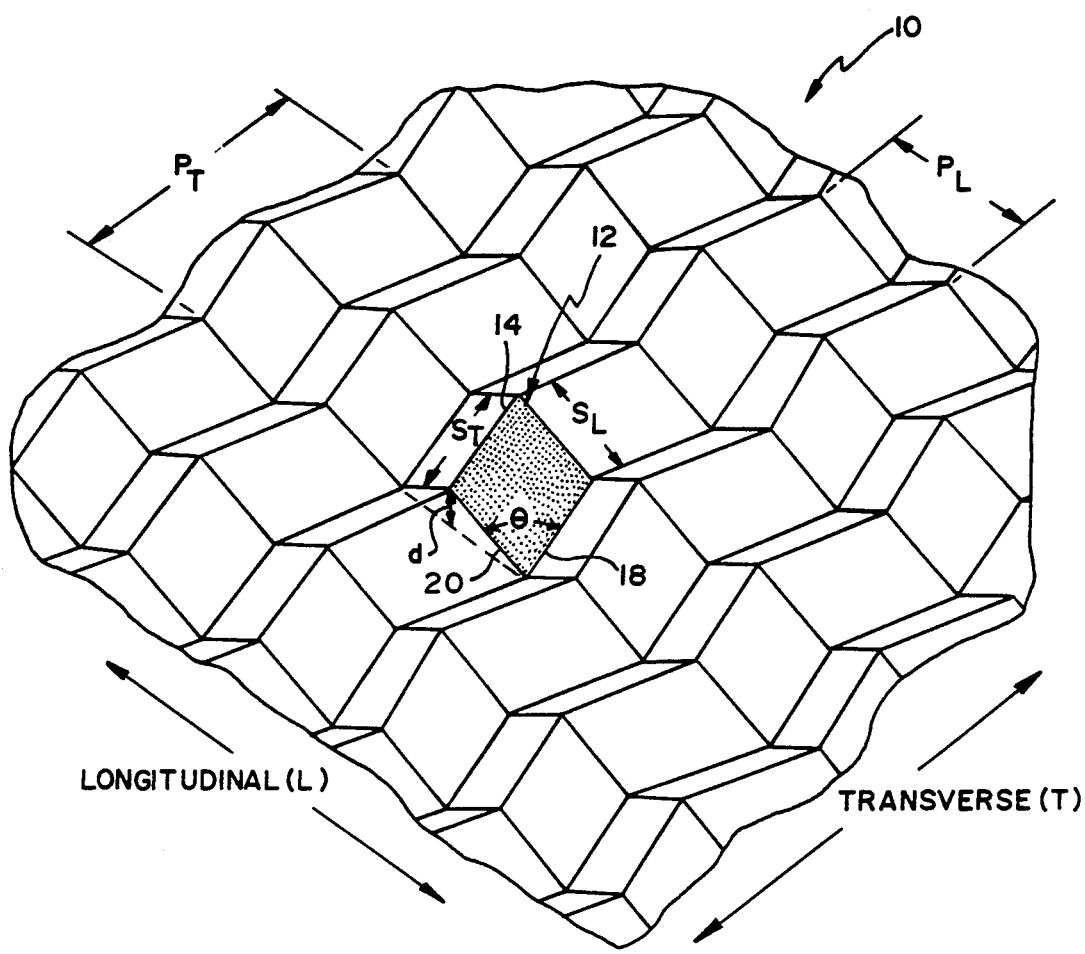
FIG. 1 is a perspective illustration of a continuous sheet of membrane-type material for use as a tension and compression liner for a primary vessel, in accordance with the principles of the present invention.
Figure 5:
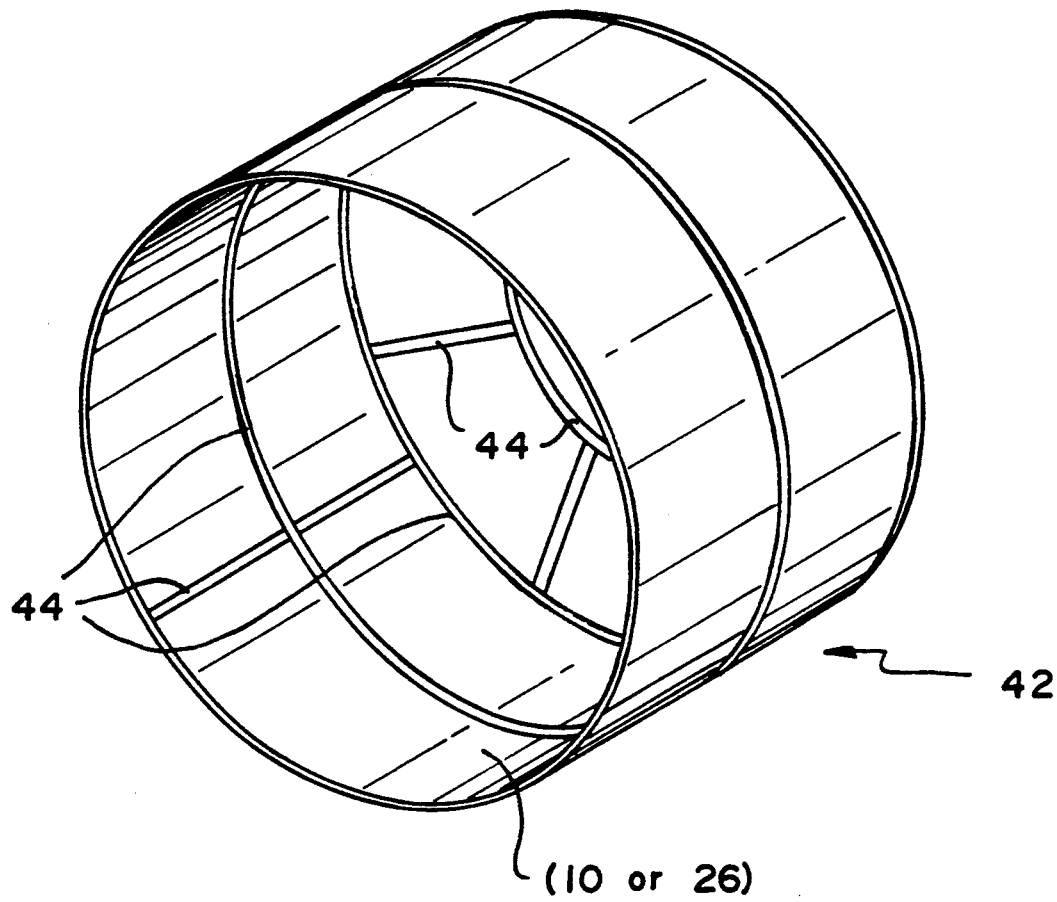
FIG. 5 illustrates the use of a plurality of attached corrugated continuous sheets of membrane-type material, constructed in accordance with the principles of the present invention, attached together to form a tension and compression extensible liner for a primary vessel.

Referring to the drawings and the characters of reference marked thereon, FIG. 1 illustrates a sheet of membrane-type material, designated generally as 10, which when connected to similar sheets form a tension and compression extensible liner for a primary vessel. (These attached continuous sheets are illustrated in FIG. 5 below.)

Figure 1A:
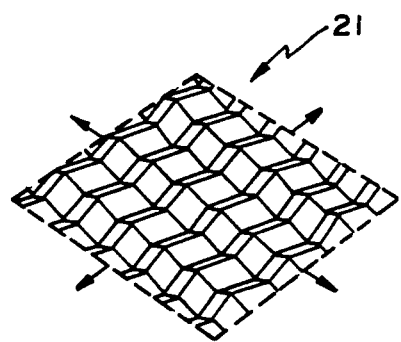
FIG. 1a illustrates the +/+ extension strain characteristics of the continuous sheet illustrated in FIG. 1.
Figure 1B:
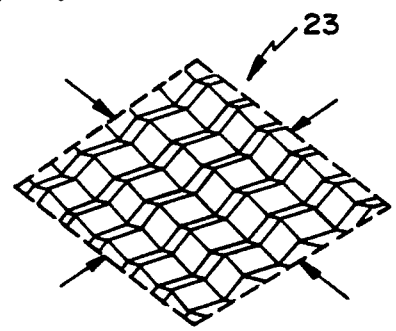
FIG. 1b illustrates the −/− compression strain characteristic of the continuous sheet of FIG. 1.

Sheet 10 has a herringbone pattern of repetitive parallelogram-like elements 12. Each parallelogram-like element 12 is bounded at its four sides 14, 16, 18, 20 by bends to adjacent parallelogram-like elements. This design produces the desirable +/+, −/− displacement characteristics illustrated by sheets 21, 23 of FIGS. 1a and 1b, respectively.

The FIG. 1 embodiment illustrates the use of parallelogram-like elements which comprise regular parallelograms having straight sides, 14, 16, 18, 20. Such +/+ and −/− strains are the characteristic of typical pressure vessel deformations and thermal deformations.

Each sheet has minimally developed corrugations. As defined herein, the term "minimally developed" means a small lateral displacement of the membrane-type material relative to the pitch of the corrugations. (That is, the depth to pitch ratio of the corrugations are typically less than 0.20.)

Figure 2:
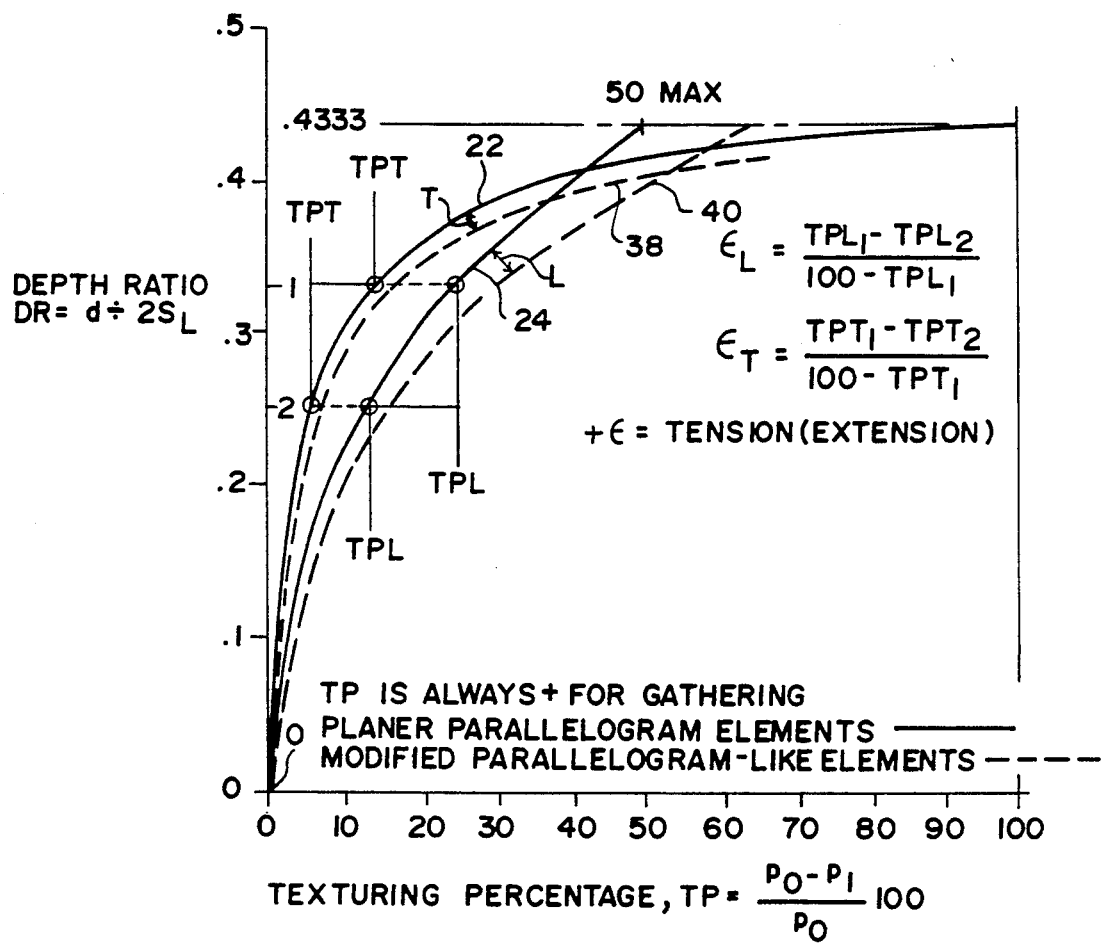
FIG. 2 is a graphical representation of depth ratio versus texturing percentage for the continuous sheets illustrated in FIGS. 1 and 3.

Referring now to FIG. 2, solid lines, 22, 24 illustrate the texturing percentage for given depth ratios for transverse and longitudinal orientations, respectively. The graphical representation in FIG. 2 is for a specific geometry, a 60° equilateral parallelogram. Other geometries can be used to produce different values for TPL (Texture Percentage Longitudinal)/TPT (Texture Percentage Transverse) and, therefore, meet a wide range of biaxial strain needs. Additionally, it is noted that the geometrical relationships illustrated in FIG. 2 are idealized and assume zero thickness membranes. As such, there is no bending stiffness and, therefore, no in-plane stiffness when the design is allowed to move in its natural, biaxial, way. (Obviously, actual liners must have some thickness and bending stiffness.) The bending stiffness limits the thickness relative to the depth (D) and the pitch (p) and produces the minimum in-plane stiffness of the liner.

The depth ratio, DR, is defined as equal to $d \div 2S_L$, where $S_L$ is the length of the longitudinal side of the parallelogram element 12 and d is the out-of-plane depth of the corrugation. (See FIG. 1.) The texturing percentage (TP) is defined as $[(p_0-p_1)/p_0]100$. (Since $\theta$ equals 60° for the example, $S_L$ equals $S_T$, and $p_T$ equals $2S_L$).

The maximum bending stresses will occur at the bends or folds in the sheet and, therefore, sharp bends or folds are undesirable. It is also noted that the working, useful range of strain will never use the full range of the TP (i.e. springs are never designed to pull straight). Therefore, the as-manufactured TP will always be greater than the working strain requirements. Therefore, points 1 and 2 in FIG. 2 represent the working range of a depth ratio and $\epsilon$ represent the working strain of that particular geometry, wherein $\epsilon_L$ equals $(TPL_1-TPL_2)/(100-TPL_1)$ and $\epsilon_T$ equals $(TPT_1-TPT_2)/(100-TPT_1)$.

From a purely mathematical approach, therefore, it would appear, except for weight, that a fully developed gathered design would be the desired approach. Because the required strain absorption is so much less (10 times) than the available texture percentage, it is possible to use a minimal development of gathering. Also, a minimal gathering facilitates the joining of the sheets and reduces the bending stresses at the folds. Additionally, the relatively rigid nature of the parallelogram plane elements 12 dictates a specific biaxial displacement relationships for maximum flexibility. Other effects, such as forced out-of-plane deformation, saddling, occurs when the textured sheet is curved. These effects can be minimized if necessary by modifying the planar parallelogram elements' design.

FIGS. 3, 3a, and 3b illustrate that the parallelogram planes can be further textured by out-of-plane forming in the form of circular arcs or sine wave shapes. Also, the sides of the parallelogram-like elements have circular or sine wave shapes. FIG. 3 illustrates a sheet of such a membrane-type material, designated generally as 26. As used herein, the term "parallelogram-like" refers to a geometry generally resembling a parallelogram, however, the sides may not be straight and instead have some curvature. As the shading in this drawing illustrates, the out-of-plane forming and the sides are developed from the sine wave or circular arc forms. It is noted that although one element 28 is shown shaded, the remaining parallelogram-like elements are similarly textured.

As illustrated in FIG. 3a parallelogram elements 28' may have sides formed in the shapes of circular arcs (of radii $R_L$ and $R_T$).

FIG. 3b illustrates the use of parallelogram elements 28" having sides formed in the shapes of sine waves. The out-of-plane forming is also developed from a sine wave. (Similarly, for FIG. 3a, the out-of-plane forming and the edges are developed from circular arcs.)

The FIG. 3 illustrated, modified parallelogram-like elements 28 form a design compatible with the gathering characteristic of the Origami design of FIG. 1. Although some minimal shear deformation of the sheet material is required, use of this modified texturing eliminates the discrete bend lines and sharp bends or folds and lowers the maximum stresses in the sheet due to the basic strain requirements. It provides for a wider range of flexibilities needed to meet a practical set of design requirements.

Figure 4:
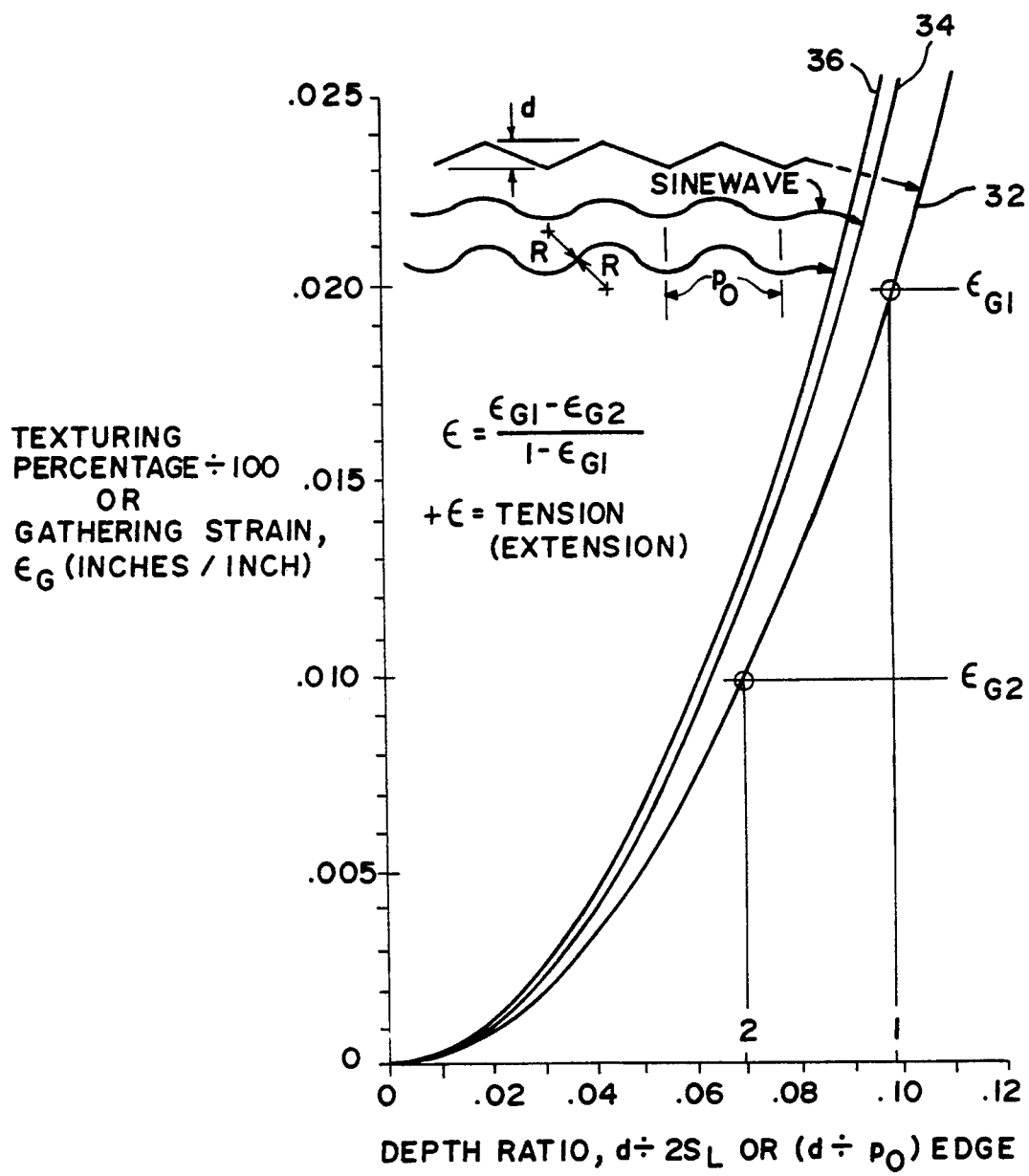
FIG. 4 is a graphical representation of texturing percentage versus depth ratio for a saw tooth pattern, sine wave pattern, and circular arc pattern of sides, illustrating edge texturing and the effects of modification.

FIG. 4 illustrates the increase in TP as compared to the saw tooth waveform. Curve 32 represents a saw tooth edge (i.e. FIG. 1 embodiment), curve 34 illustrates a sine wave edge (i.e. FIG. 3b embodiment) and curve 36 illustrates a semi-circular edge waveform (i.e. FIG. 3a embodiment). This figure shows that the modified waveforms produce a higher texturing percentage than the saw tooth waveform for a given depth ratio. Applying this added texturing percentage to the biaxial texturing percentages of FIG. 2 results in lines 38, 40 in FIG. 2. Thus, one can develop a new set of texturing factors to suit the requirements for a specific application or a range of applications. Utilizing minimally developed corrugations provides for easy joining of the sheets of membrane-type material. Minimally developed corrugations facilitate modification of the sheet boundaries for joining.

Referring now to FIG. 5, utilization of the continuous sheets (10 or 26) for use as a liner for a primary vessel 42 is illustrated. The sheets (10 or 26) are attached at joints 44. Each sheet may have a modified edge where that sheet is attached to an adjacent sheet. A re-formed two-dimensional continuous wave is located at the modified edge which has compatible geometry with an associated two-dimensional wave located at the modified edge of the adjacent sheet or to close-out edge members of the primary vessel. Each modified edge is designed to be compatible with the texturing percentage of a main portion of that sheet.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A tension and compression extensible liner for a primary vessel, comprising:

a plurality of attached corrugated continuous sheets of membrane-type material, each sheet having a herringbone pattern of repetitive parallelogram-like elements, each parallelogram-like element being bounded at its four sides by bends to adjacent parallelogram-like elements each sheet having minimally developed corrugations having depth to pitch ratios of less than 0.20, said continuous sheets thereby being supportable by load bearing walls of said primary vessel, for following any deflections of said walls, under conditions of structural stress and thermal deformation.

2. The extensible liner of claim 1, wherein said parallelogram-like elements comprise regular parallelograms having straight sides.

3. The extensible liner of claim 1, wherein said sides comprise circular arcs and said bends comprise circular arcs over the length of each said parallelogram-like element.

4. The extensible liner of claim 1, wherein said sides comprise sinusoidal arcs and said bends comprise sinusoidal arcs over the length of each said parallelogram-like element.

5. The extensible liner of claim 1, wherein said plurality of corrugated continuous sheets each have a modified edge where said sheet is attached to an adjacent sheet, a re-formed two-dimensional continuous wave being located at said modified edge which has compatible geometry with an associated two-dimensional wave being located at the modified edge of said adjacent sheet or to close-out edge members of the primary vessel, each modified edge designed to be compatible with the texturing percentage of a main portion of that sheet.

6. A continuous sheet of membrane-type material for use as a tension and compression liner for a primary vessel, comprising:
a herringbone pattern of repetitive, contiguous parallelogram-like elements, each parallelogram-like element being bounded at its four sides by bends to adjacent parallelogram-like elements, said sheet having minimally developed corrugations having depth to pitch ratios of less than 0.20, said sheet thereby being supportable by load bearing walls of said primary vessel for following any deflections of said walls, under conditions of structural stress and thermal deformation.

* * * * *